W. B. ABRAMS AND R. I. GAY.
DIVIDER FOR DOUGH OR THE LIKE.
APPLICATION FILED NOV. 20, 1919.

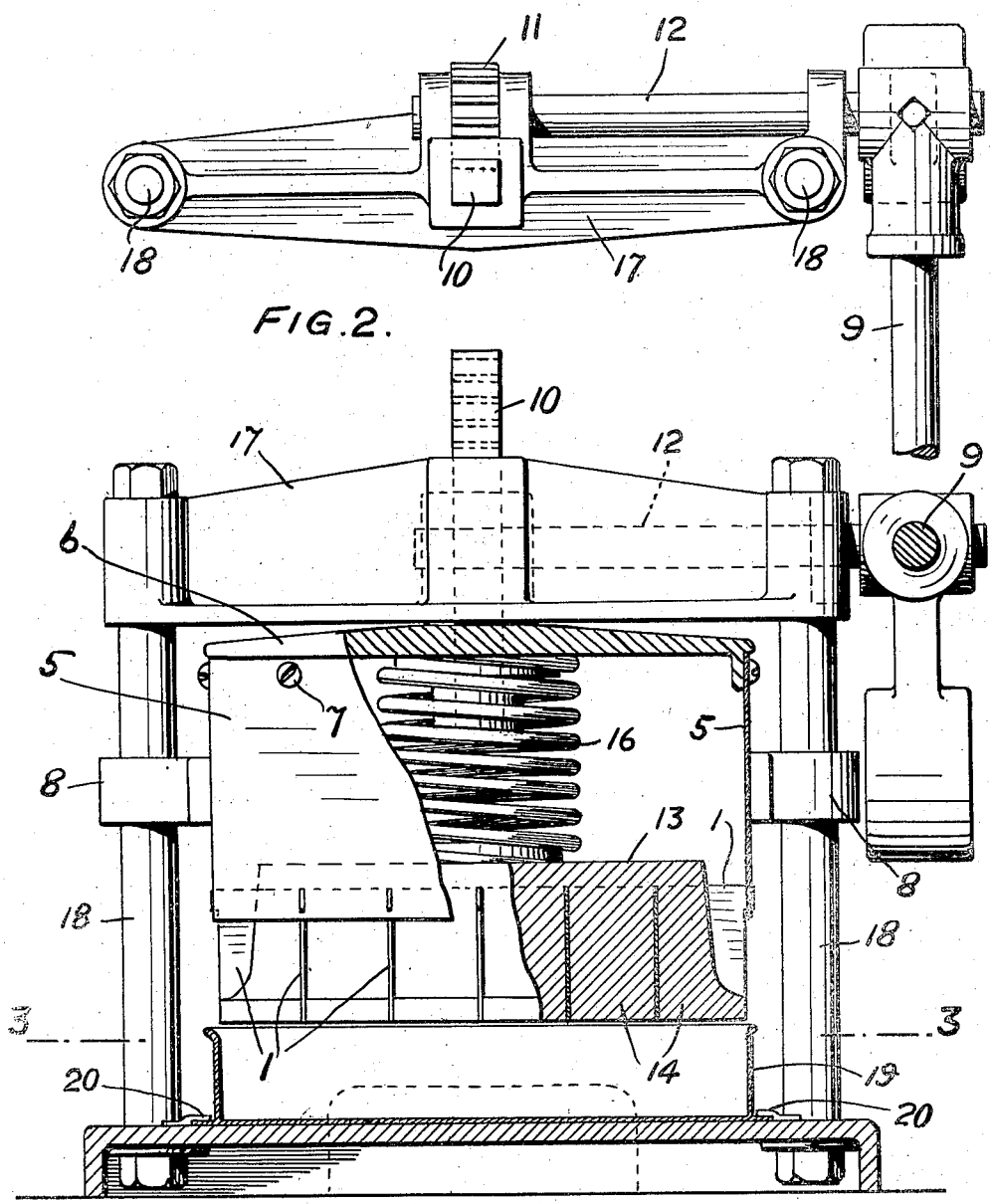

1,352,424. Patented Sept. 14, 1920.
3 SHEETS—SHEET 2.

WITNESS:

INVENTORS
William B. Abrams
Robert I. Gay
BY
ATTORNEY.

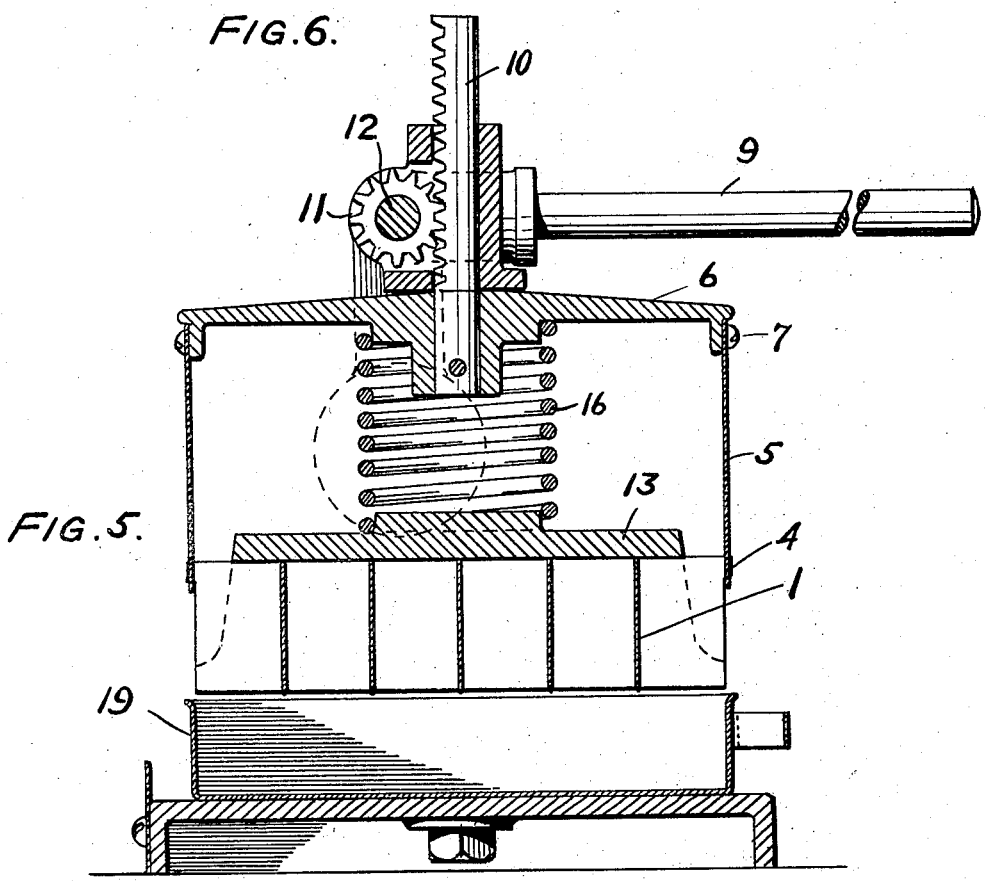

UNITED STATES PATENT OFFICE.

WILLIAM B. ABRAMS AND ROBERT I. GAY, OF PHILADELPHIA, PENNSYLVANIA.

DIVIDER FOR DOUGH OR THE LIKE.

1,352,424.     Specification of Letters Patent.     Patented Sept. 14, 1920.

Application filed November 20, 1919. Serial No. 339,499.

*To all whom it may concern:*

Be it known that we, WILLIAM B. ABRAMS and ROBERT I. GAY, citizens of the United States, residing at Philadelphia, in the county of Philadelphia and State of Pennsylvania, have jointly invented a certain new and useful Divider for Dough or the like, of which the following is a specification.

Our invention relates to improvements in machines for dividing dough or the like into equal parts, or parts of equal weight, and its principal objects are, first, to improve, simplify and cheapen the construction and assemblage of the parts; second, to facilitate the operation of cleaning the working parts of the machine which operate upon the dough; and third, to provide a self-contained and stationary or portable dough divider that can be operated manually.

Other objects of the invention will appear from the following description, and the invention will be claimed at the end hereof.

In the following description reference will be made to the embodiment of the invention illustrated in the accompanying drawings forming part hereof and in which—

Figure 1, is a side view, partly in section, illustrating a machine embodying features of the invention.

Fig. 2, is a top or plan view of the upper part of the machine.

Fig. 5, is a transverse sectional view, and

Figs. 6 and 7, are detached views of the straight blades.

Figure 4:
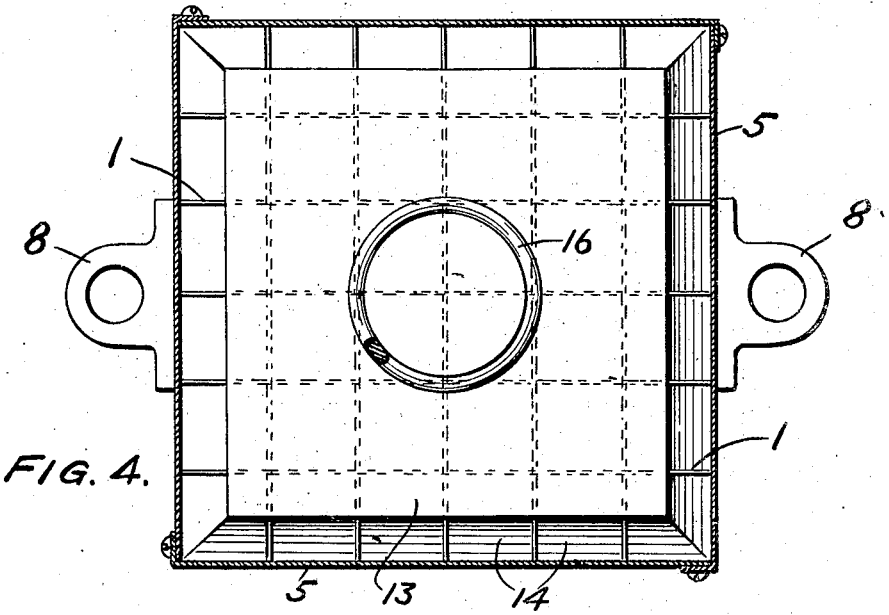
Fig. 4, is a top or plan view partly in section with some of the superstructure removed.
Figure 3:
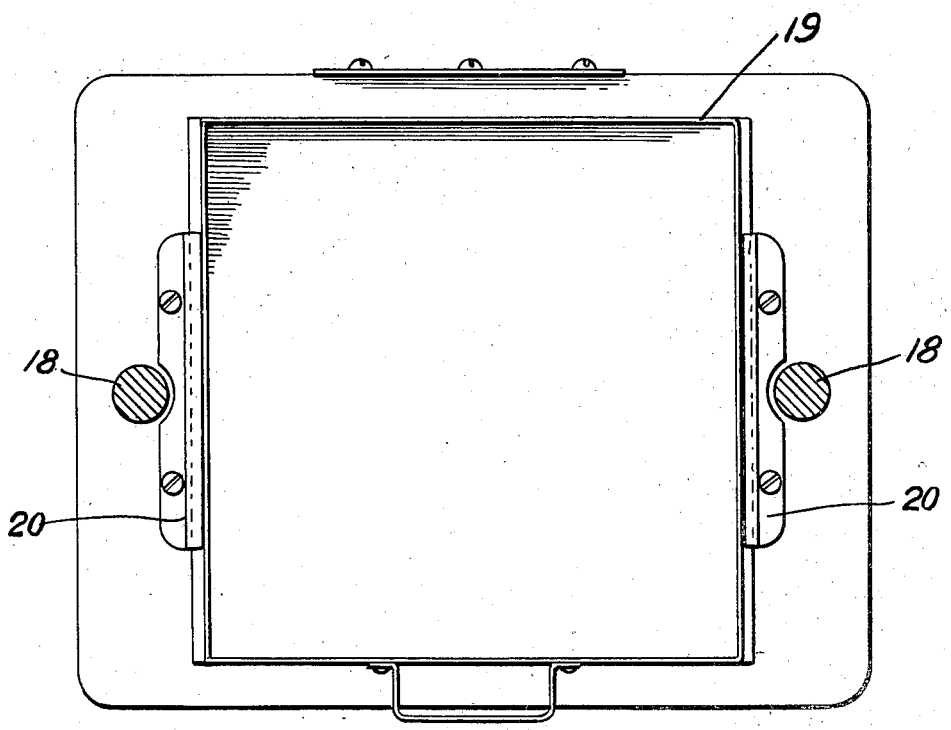
Fig. 3, is a sectional view on the line 3—3, of Fig. 1.

In the drawings 1, generally, is a grillage or framework composed of straight blades crossed at right angles by similar straight blades notched upon them and it is used as a die. Such a die is possessed of many advantages; its blades may be inexpensively made since they are all substantially or in most respects alike, it is easy to assemble, its blades are readily renewable, and it is convenient to clean. Moreover such a die is easily mounted and is capable of coöperation with a desirable form of stripper, to be presently described, which can be made in one piece. The grillage shown consists of five straight blades 2, and five straight blades 3, differing only in respect to the location of the lugs, ears or extensions 4. The sectional housing 5, is detachably attached to the head 6, by screws 7, which can be removed to detach the die and housing for cleaning, repairs or other purposes. The sections of the housing are provided with openings to detachably receive the lugs or ears 4, of the blades. The sections of the housing shown in Fig. 4, are four in number and they are detachable from each other, as shown in said figure, by means of four screws arranged at the corners, as well as from the head and grillage as has been pointed out. When the housing has been detached from the head, the detachment and attachment of its sections in respect to each other afford convenient means for disassembling and assembling all the parts that contact with the dough including the blades of which the projections 4, coöperate with the opening provided in the sections of the housing. The head is moved in both directions by the hand lever 9, through the instrumentality of a rack 10, and a pinion 11, operated by a shaft 12. 13, is a stripper base provided with spaced stripper fingers 14, arranged in the interstices of the grillage and consisting of columns integral with the base and rectangular in form. The fingers may be provided by notching the stripper base in two directions with intersecting grooves. The stripper base works in the housing 5, and has yielding connection with the head 6, by means of the spring 16. 17, is a crosshead carried by guide posts 18, and it is a support for the shaft 12. The posts 18, guide the housing 5, by means of ears 8. 19, is a pan guided and held down by guides 20, on the bed plate of the machine.

In use a quantity of dough to be divided into thirty-six equal parts, placed in the pan 19, is subjected to the action of the stripper fingers and die by working the hand lever 9, down and up. On the down stroke the ends of the stripper fingers 14, and die descend and the former backed up by the spring 16, spread the dough, whereupon the spring 16, yields and the die descends past the stripper fingers and through the spread dough dividing it into equal parts. On the up stroke the die comes out of the dough and the spring 16, acting on the stripper base, causes the ends of the stripper fingers to hold down the divided parts of the dough.

To those skilled in the art to which the invention relates it will be obvious that modifications can be made in details of construction and arrangement without departing from the spirit of the invention, hence the invention is not limited in respect to such matters or otherwise than as the prior art and the appended claims may require.

We claim:

1. In a divider for dough and the like the combination of a head, housing sections demountably attached to the head and to each other and provided with openings, a grillage of straight blades notched together and provided with extensions demountably arranged in said openings and held by the walls thereof immovable in respect to the head, and a stripper base arranged in the housing and having yielding connection with the head and provided with rectangular fingers integral with the base and arranged in the interstices of the grillage, substantially as described.

2. In a divider for dough and the like the combination of a head, housing sections provided with openings and demountably attached to the head and to each other, a grillage of straight blades notched together and demountable in respect to the head and housing sections and provided with extensions detachably and tightly fitting said openings, and a stripper base arranged in the housing and having yielding connection with the head and provided with rectangular stripper fingers arranged in the interstices of the grillage, substantially as described.

WILLIAM B. ABRAMS.
ROBERT I. GAY.